March 1, 1966 A. SCHRADER ETAL 3,238,515

MAGNETIC DATA TRANSFER APPARATUS

Filed April 13, 1961 2 Sheets-Sheet 1

March 1, 1966 A. SCHRADER ETAL 3,238,515

MAGNETIC DATA TRANSFER APPARATUS

Filed April 13, 1961 2 Sheets-Sheet 2

3,238,515
Patented Mar. 1, 1966

3,238,515
MAGNETIC DATA TRANSFER APPARATUS

Albert Schrader and Horst Schenk, both of Amberg, Germany, assignors to Siemens-Schuckertwerke Aktiengesellschaft, Berlin-Siemensstadt, Germany, a corporation of Germany Filed Apr. 13, 1961, Ser. No. 102,748
5 Claims. (Cl. 340—174)

Our invention concerns magnetic data transfer apparatus and is related to the apparatus described in copending applications Serial No. 833,185, filed August 12, 1959, of W. Engel et al., and Serial No. 9,542, now U.S. Patent No. 3,080,550, filed February 18, 1960, of F. Kuhrt, both applications being assigned to the assignee of the present invention.

In a more particular aspect, our invention relates to systems for magnetically entering identifying data or code signals upon a travelling carrier which, when arriving at, or passing by, a receiving or read-out device transfers the impressed magnetic signals to respective transducer circuits for performing a predetermined control operation. Such magnetic data transfer systems are applicable, for example, in conveying and distributing systems where a number of conveying units such as parcels or vehicles, travelling from a loading station, are to be selectively distributed to various destinations and for that purpose are magnetically impressed at the loading station with a destination-identifying code combination. Aside from parcel distributing conveyor systems or pneumatic tube conveyors, such magnetic data transfer apparatus are applicable for the mules in mines or for other vehicle marshalling plants. The signal combination impressed upon the travelling carrier and transferred to the receiver or read-out device may serve indicating or communication purposes or it may directly release a control signal, for example in order to automatically energize a rail or conveyor switch which deflects the travelling unit to a siding or branch leading to the intended destination.

According to the above-mentioned copending application Serial No. 9,542, now U.S. Patent No. 3,080,550, the signal carrier on the travelling unit in such a system is provided with a number of permanent magnets that are rotatably mounted individually and, when close to the data entering device at the loading station, are magnetically turned to a predetermined magnetic orientation, so that the signal to be impressed upon the data storing device of the travelling unit is constituted by the code combination of magnetic orientations represented by the respective magnets. When the data storer device on the travelling unit enters into proximity with the transducers of the receiver or read-out device, a group of respective transducers convert the magnetic signals into corresponding electric voltages whose polarities are again representative of the code signal so as to be capable of performing a selective or discriminating control operation in accordance with the original identifying signal. In the magnetic data transfer system according to Serial No. 9,542, now U.S. Patent No. 3,080,550, the data entering device is provided with rotatably adjusted magnets of the electromagnetic or permanent-magnet type whose respective pole faces are located one beneath the other. That is, the magnetic axes of the field magnets in the data entering device extend at a right angle to the travelling direction of the data storer assembly whose rotatable permanet magnets are to be turned to respective positions depending upon the selected polarities of the field magnets in the data entering device.

In such a data transfer system, the rotational setting of the permanent magnets in the data storing device takes place abruptly at the moment when these magnets pass through close proximity to the previously adjusted and then fixed impression magnets of the data entering unit. The direction in which each rotatable magnet of the data storer device will then rotate to a new pole position, is indefinite. As a consequence, an appreciable limitation is imposed upon the speed with which the data storer device may travel past the data entering device.

It is an object of our invention to eliminate or minimize such limitation and to provide a magnetic data transfer apparatus, generally of the above-mentioned type, which affords a reliable operation at a higher travelling speed than heretofore applicable.

To this end, and in accordance with our invention, we mount the field magnets of the data entering device in such a manner, or give these magnets such a design, that their pole faces are displaced relative to each other in a direction parallel to the travelling direction of the data storer device.

According to a more specific feature of the invention, each individual magnetic field structure of the data entering device comprises an elongated magnetizable member with pole faces at respective ends, with the longitudinal axis of the field member extending at an acute angle to the travelling direction of the data storer device, this angle being relatively small so that the just-mentioned pole faces are sequentially located directly opposite the north and south poles of the rotatable magnets of the data storer unit as the latter travels by the data entering device.

According to another, preferred, feature of our invention, the magnetic field structures in the data entering device are each composed of several magnet units which, for obtaining a minimum stray flux, are mounted on a sheet-metal yoke member of soft-magnetic material, i.e., a ferromagnetic material of high permeability and negligible remanence. The provision of such soft-magnetic yoke sheets has the advantage that commercially customary permanent magnets can be used in the data entering device and that, despite the above-mentioned displacement of the pole faces with respect to each other, a relatively slight magnetic stray flux is incurred. Consequently for a given permanent magnet in the data entering device, a correspondingly stronger magnetic action upon the rotatable magnets of the data storer device is obtained, or the action is secured at a greater distance than otherwise possible.

For operation at relatively high travelling speed of the data storer device, it is further of advantage to give the magnetic field structures in the data entering device a subdivided design whose individual portions can be adjusted with respect to their mutual spacing in the travel direction. Preferably each field structure comprises two or more pole faces of the same magnetic polarity that are likewise displaced from each other in the travel direction, aside from the fact that the entire group of such pole faces is displaced in the same direction from the pole-face group having the opposite magnetic polarity.

The foregoing and other objects and features of our invention, said features being set forth with particularity in the claims annexed hereto, will be described in the following with reference to the embodiments of data transferring apparatus according to the invention illustrated by way of example in the accompanying drawings, in which:

Figure 7:
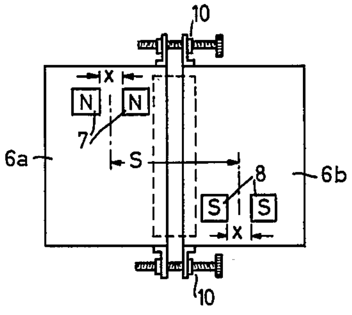

FIG. 7 forms a front view of another modification of a field structure in the data entering device.

Figure 8:
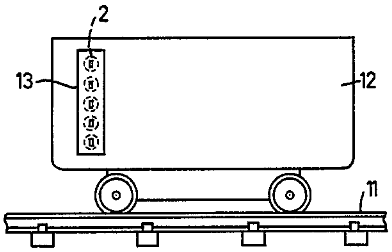

FIG. 8 is a side view of a mule provided with a data storer device according to the invention.

Figure 9:
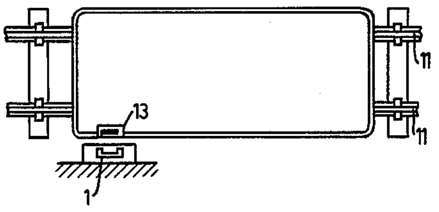

FIG. 9 is a top view of the same mule in a travel position where the data entering device is located close to the data entering device of the system.

Figure 1:
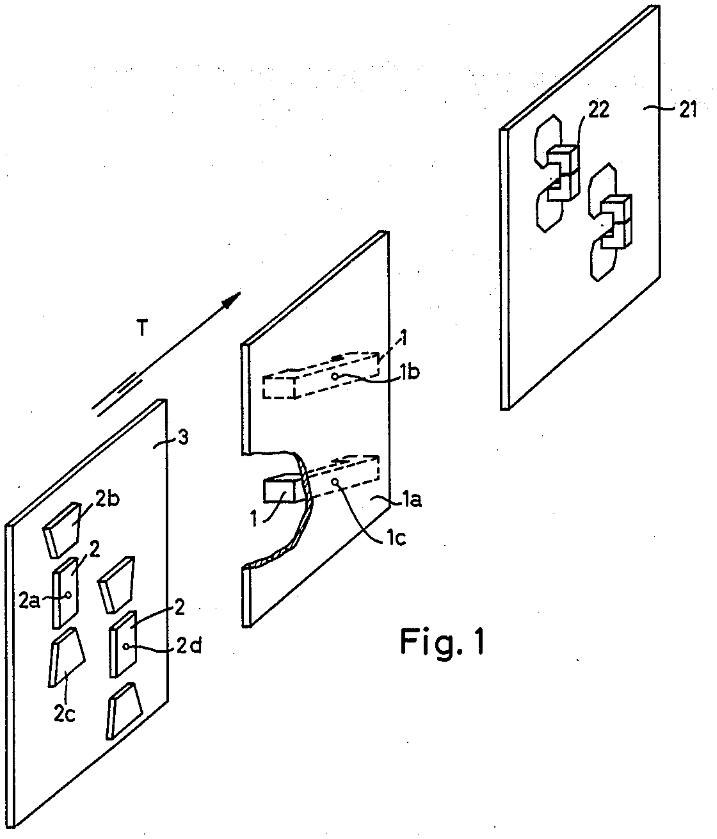
FIG. 1 shows in schematic perspective a complete magnetic data transfer apparatus comprising a data entering device, a data storer device and a data reproducing device, the data storer device being displaceable past the stationary entering device and relative to the stationary reproducing device.

According to FIG. 1, the data storing device comprises a panel 3 on which a group of permanent magnets 2 are mounted for rotation about respective pivots 2*a* and 2*d* located on the gravity axes of the magnet bodies. While only two magnets are shown, any desired number may be provided. The data storer device 3 is displaceable in the travel direction indicated by an arrow T.

The data entering device comprises a panel 1*a* on which a number of field structures 1 are mounted, the number of these field structures being equal to the number of rotatable magnets in the storer unit. As will be described below, the field structures 1 may also consist of permanent magnets. They are rotatably adjustable about respective pivots 1*b* and 1*c* in accordance with a desired magnetic orientation; but once properly adjusted, these field structures remain stationary during the data transferring operation described below. The spacing between the panel 3 and the panel 1*a* with the stationary magnetic field structures 1 may amount to a few centimeters when the storer device, on its travel, is located opposite the data entering device. The entering of the information on the storer device takes place without mechanical contact, nor is it necessary, as a rule, to stop the storer device for data entering purposes.

Figure 2:
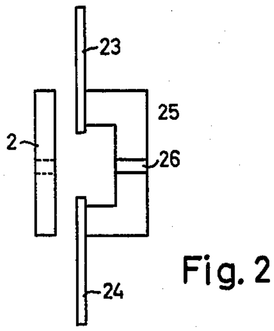
FIG. 2 is a lateral view of one of the reproducing transducers in the reproducing device, in juxtaposition with a rotatable magnet of the data storer device.

The data reproducing device comprises a panel 21 on which a number of transducer heads 22 of the Hall-voltage generating type are mounted. According to FIG. 2, each transducer head comprises a U-shaped magnetizable yoke 25 with a field gap in which a semiconducting Hall plate 26 is located. Mounted on the front faces of the U-shaped yoke are magnetizable pole shoes 23 and 24 consisting of relatively large sheet-metal members. The design and operation of the illustrated Hall-voltage generating transducers is in accordance with the transducers illustrated and more fully described in the above-mentioned copending application Serial No. 833,185.

Figure 3:
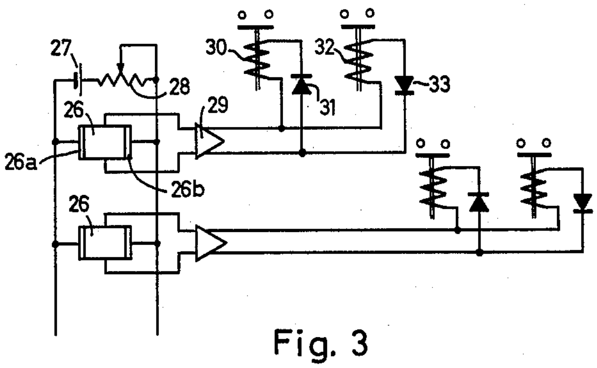
FIG. 3 shows schematically an electric circuit diagram for two transducers of the data reproducing device.

Each Hall plate 26 consists of a thin layer or wafer of semiconducting material such as indium arsenide or indium antimonide. The Hall plate is rectangular and has two metallic current supply terminals extending along two opposite edges of the rectangular wafer, such as the electrodes denoted by 26*a* and 26*b* in FIG. 3. Each Hall plate is further provided with two probe-type Hall electrodes located on the two other rectangle sides midway between the two terminals. The Hall electrodes are connected through an amplifier 29 with a relay 30 polarized by means of a diode 31, or if desired are also connected with a second relay 32 polarized by means of a diode 33 in opposite sense with respect to the relay 30.

It will be understood that each of the transducers 22 has its Hall plate 26 connected in the same manner as just described. All Hall plates of the reproducing unit are energized from a current source 27 through a calibrating resistor 28. The energizing current may be a direct current of normally constant voltage or an alternating current of a given frequency and constant voltage amplitude. When the magnetizable yoke 25 is not subjected to the field of one of the permanent magnets of the data storer device, the two Hall electrodes of each Hall plate 26 have the same potential so that no output voltage is produced. However, when a permanent magnet 2 of the travelling storer unit approaches the corresponding transducer 22, a corresponding magnetic field becomes active in the field gap in which the Hall plate is located. This causes a Hall voltage to appear between the Hall electrodes. The polarity of this voltage, or the instantaneous polarity in the case of alternating current, depends upon the magnetic orientation of the particular permanent magnet 2 then in the vicinity of the transducer 22.

Due to the polarization of relay 30, this relay will respond only if the output voltage of amplifier has the proper polarity. In this manner the reproducing device discriminates between two (positive and negative) magnetic orientations of the correlated permanent magnet 2 of the travelling data storer device. When two relays 30 and 32 are provided, one relay will respond to one magnetic orientation of the data storer magnet 2, whereas the other relay will respond to the other magnetic orientation. Depending upon the particular combination of relays that operate at a time, a different code combination of signals and hence respectively different data or groups of information are transmitted and reproduced.

As shown in FIG. 1, each rotatable permanent magnet 2 of the data storer device is located between two fixed pole shoes 2*b* and 2*c* of soft-magnetic material. These two pole shoes, consisting of soft iron or other magnetizable material of high permeability, secure the permanent magnet in one of two fixed preferential positions but permit turning the magnet 2 a fixed angle of 180° by applying the magnetic force of the data entering field structures 1 as described above.

Figure 4:
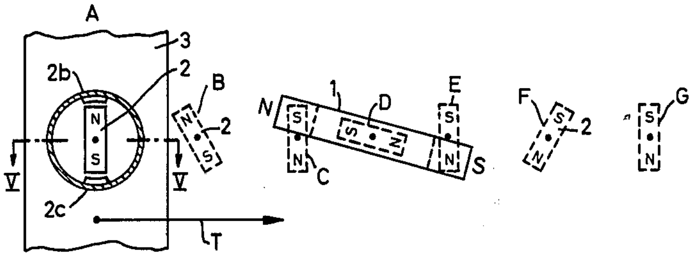
FIG. 4 shows schematically a lateral view and FIG. 5 a corresponding view of one of the rotatable magnets in the data storer device in different respective travel positions relative to one of the field structures in the stationary data entering device.
Figure 5:
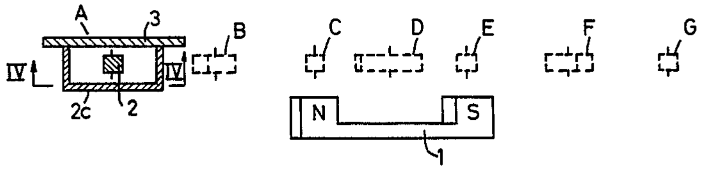

The field structures 1 in the data entering device, these structures consisting for example of permanent magnets, are so arranged that their pole axis extends at an angle to the travelling direction T of the data storing unit, this being more fully apparent from FIGS. 4 and 5. As a consequence, the north pole N and the south pole S of the field magnet 1 are spaced from each other in a direction parallel to the travel direction T of the storer unit. In FIGS. 4 and 5 the field magnet 1 is assumed to be fixed and the storer magnet 2 on panel 3 is assumed to travel in the direction of the arrow T from position A through positions B, C, D, E, F to position G. In position A the storer magnet 2 is held in its previous magnetic orientation by means of the pole shoes 2*b* and 2*c* as described above, it being assumed that the north pole N is at the top. When the magnet 2 reaches a position B, it enters into the active magnetic field range of the data entering field magnet 1. Consequently, the north pole N of magnet 2 is deflected toward the left, and the magnet turns about its pivot through an angle of 180°. When the rotatable magnet 2, in position C, is located opposite the north pole N of the entering magnet 1, the rotation is already completed, but the rotatable magnet may become deflected to the position D to eventually return to the position shown at E. When the magnet 2 leaves the action range of the field magnet 1, the magnet 2 may become slightly deflected in the clockwise direction but is ultimately returned to the proper position shown at G, due to the action of the pole shoes 2*b* and 2*c*.

At relative high speed of the travelling data storer unit or at low field strength of the data entering unit, the south pole S supports the action of the north pole of field structure 1 and thereby contributes to reliable signal entering performance.

Figure 6:
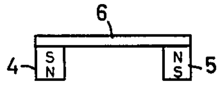
FIG. 6 illustrates a modification of one of the field structures in the data entering device.

FIG. 6 shows a modification of the data entering magnet in which the displacement of the pole faces is obtained by mounting two permanent magnets 4 and 5 in series-cumulative magnetic relation upon the ends of a soft-magnetic yoke strip or sheet 6. The magnets 4 and 5 may be secured to the yoke 6 in any suitable manner, for example by cementing.

In the embodiment according to FIG. 7, two magnetizable sheets *6a* and *6b* are each provided with two permanent magnets; the sheet *6a* being provided with the permanent magnets 7 and the sheet *6b* being provided with the permanent magnets 8. The two magnets 7 on sheet *6a* are fastened to the sheet in spaced relation to each other so as to form two north poles N of the field structure. The magnets 8 are analogously mounted on the sheet member 6*b* so as to form two south poles S of the field structure. The preferable mutual spacing *x* of the magnets having the same magnetic orientation, and the preferable spacing S between the two groups of magnets is determined by the travelling speed of the rotatable magnets 2 relative to the entering magnets and also by the field strength necessary for a given spacing between data entering device and data storing device. By varying the spacing *x*, a given minimum field strength can be adjusted for a corresponding travel distance. By varying the spacing S, the interval of time is determined for a given travel speed that elapses between the entering action of the first and second magnet-pole groups.

The above-mentioned adjustment of the distance S is effected by means of screw spindles 10, thus readily affording an adaptation to the relative travel speed between entering magnet and rotatable magnet on the one hand, as well as to the spacing between rotatable magnet and entering magnet at the travel point where the entering device and the storer device are in proximity. The magnetic connection between the yoke sheets 6 is effected by another sheet 9 of the same material which overlaps the two mutually displaceable sheet members *6a* and 6*b*.

FIGS. 8 and 9 show a vehicle 12, such as a mule as used in mining operations, travelling on rails 11. Inserted into one side wall of the mule is an elongated box 13 with a number of rotatable magnets 2 designed and operative as described above. For entering a destination-identifying signal, the mule 12 travels past a data entering device with a number of field structures 1 located at the respective heights of the rotatable magnets 2. During travel, the rotatable magnets 2 are oriented in the proper manner so that the mule 12, when travelling into the rail system, carries with it the coded data necessary for operating the rail switches that guide the mule to the predetermined destination.

It will be obvious to those skilled in the art, upon studying this disclosure, that our invention permits of various modifications with respect to design details of its component devices and also with respect to the particular application for which the magnetic data transferring system is to be used, without departing from the essential features of our invention and within the scope of the claims annexed hereto.

We claim:

1. Magnetic data transfer apparatus comprising a data entering device, data reproducing means remote from said data entering device and a data storer device movable along a travel path including a location of proximity to said entering device and a location of proximity to said reproducing means; said data storer device having a carrier structure and a group of permanent magnets individually rotatable on said structure between two given positions corresponding to respectively different magnetic orientations substantially at a right angle to said travel path; said reproducing means having transducer means responsive to the field and magnetic orientation of said magnets when the latter are in proximity to said transducer means; and said data entering device having polarized magnetic field structures of selective magnetic orientation and capable of rotating said permanent magnets without mechanical contact when said storer device is in proximity to said entering device, each of said field structures in one selective orientation having two magnetic pole faces of respectively different polarity displaced from each other in said travel direction and located sequentially opposite one and then the other of the two poles of one of said respective permanent magnets when said storer device travels past said data entering device.

2. In magnetic data transfer apparatus according to claim 1, each of said field structures of said data entering device consisting of a reversibly mounted, elongated and permanently magnetized member whose pole axis extends at an acute angle to said travel path when said field structure is in active position.

3. In magnetic data transfer apparatus according to claim 1, each of said field structures of said data entering device comprising an elongated yoke member of magnetizable sheet material and two permanent magnets joined with said member at the respective ends thereof with series-cumulative magnetic poling to provide north and south poles respectively at the extremities of the respective magnets.

4. In magnetic data transfer apparatus according to claim 1, each of said field structures of said data entering device comprising a magnetizable yoke structure and having two groups of poles spaced from each other along said travel path, the poles of one group having the same polarity among themselves and different polarity from the other group, and the poles within each group being also spaced from each other in said travel direction.

5. In magnetic data transfer apparatus according to claim 1, each of said field structures of said data entering device comprising two holder members of magnetizable material, magnet means mounted on said respective holder members and having respective magnet poles spaced from each other in the direction of said travel path, and adjusting means for displacing one of said holder members relative to the other to thereby change the mutual spacing of said poles for adapting said data entering device to different travel speeds of said data storing device.

References Cited by the Examiner

UNITED STATES PATENTS

| | | | |
|---|---|---|---|
| 2,815,182 | 12/1957 | Mittag et al. | 243—16 |
| 2,900,146 | 8/1959 | Hafner | 243—16 |
| 2,927,253 | 3/1960 | Mittag | 243—16 |

IRVING L. SRAGOW, *Primary Examiner.*